United States Patent [19]

Bonicioli et al.

[11] Patent Number: 4,912,704
[45] Date of Patent: Mar. 27, 1990

[54] DIGITAL INTERFACE DEVICE FOR PCM DATA, IN PARTICULAR FOR DIGITAL TELEPHONE, DATA PROCESSING OR IMAGE PROCESSING SYSTEMS

[75] Inventors: Paolo Bonicioli, Cernusco sul Naviglio; Gianbattista Carminati, Milan; Giorgio Buonfigliuoli, Peschiera Borromeo, all of Italy

[73] Assignee: Etefin S.p.A., Vimodrone, Italy

[21] Appl. No.: 156,700

[22] Filed: Feb. 17, 1988

[30] Foreign Application Priority Data

Feb. 27, 1987 [IT] Italy ................. 19523 A/87

[51] Int. Cl.[4] .............................................. H04J 3/02
[52] U.S. Cl. .................................... 370/85.1; 370/112
[58] Field of Search .................. 370/29, 83, 94, 85.1, 370/94.1, 112

[56] References Cited

U.S. PATENT DOCUMENTS

| | | | |
|---|---|---|---|
| 4,389,544 | 6/1983 | Wagner et al. | 370/29 |
| 4,644,525 | 2/1987 | Ellis et al. | 370/29 |
| 4,720,828 | 1/1988 | Jones | 370/85.1 |
| 4,730,348 | 3/1988 | MacCrisken | 370/83 |
| 4,757,518 | 7/1988 | Lagadec | 370/83 |
| 4,774,704 | 9/1988 | Gass et al. | 370/29 |

Primary Examiner—Douglas W. Olms
Attorney, Agent, or Firm—Guido Modiano; Albert Josif

[57] ABSTRACT

A digital interface for PCM data, allowing bidirectional data exchange between a processing unit and a PCM channel, the data being transmitted in records each divided into a plurality of groups (bytes) transmitted at successive periods in homologous time intervals. This interface comprises a reception memory receiving from the PCM channel data groups to be stored, a control processor connected to the reception memory and receiving therefrom complete data records, a transmission memory, receiving from the control processor data records to be transmitted on the PCM channel. The reception and transmission memories are divided into a plurality of buffers storing data records received or to be transmitted in preset time intervals. A timing phase sequencer is connected to the memories and to a protocol controller for detecting a data record reception beginning and correctly storing data groups of a same record in the reception memory and controlling transmission of a data record in data groups from the transmission memory towards the PCM channel in preset time intervals.

10 Claims, 2 Drawing Sheets

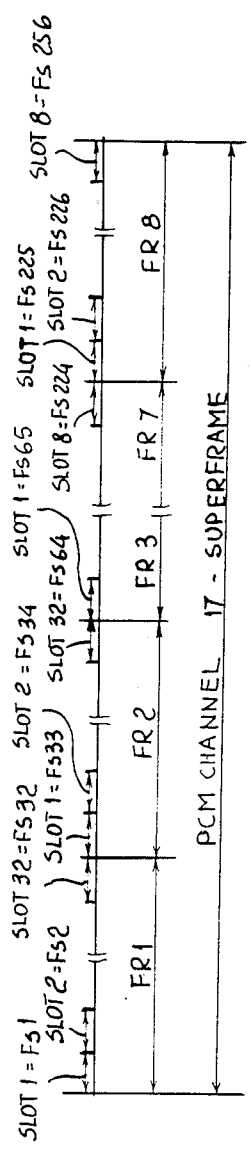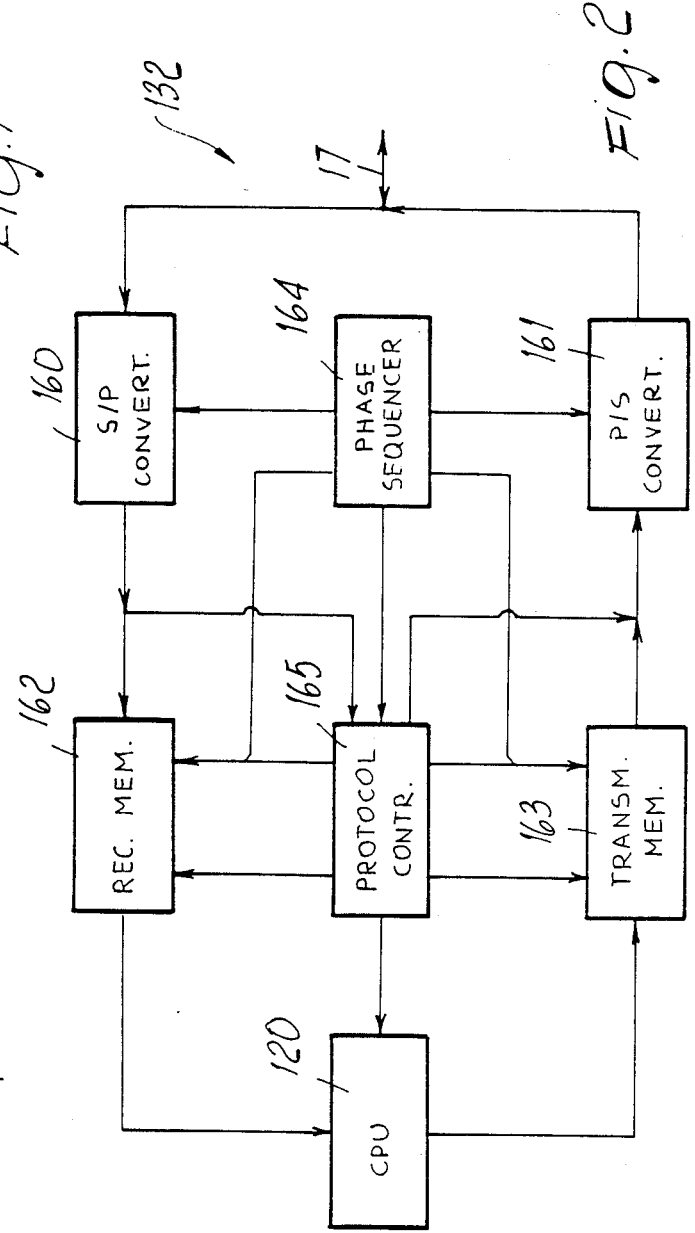

DIGITAL INTERFACE DEVICE FOR PCM DATA, IN PARTICULAR FOR DIGITAL TELEPHONE, DATA PROCESSING OR IMAGE PROCESSING SYSTEMS

BACKGROUND OF THE INVENTION

The present invention relates to a digital interface device for PCM data, in particular for digital telephone, data processing or image processing systems.

As is known, in the telephonic field, analog exchanges and systems are being gradually replaced with exchanges and systems of the digital type which, besides allowing a better processing and transmission of phonic signals, also allow the execution of data processing functions and the integration of different tasks in a same system, in particular for example for the obtainment of an increasingly complete office automation and a rational use of available resources.

Furthermore, it is well known that said digital systems use, for the transmission of both phonic and informatic data, a PCM time sharing coding, which allows simultaneous transmission on a single line of a plurality of signals, possibly conveniently sampled and sent, as successive sequences of groups of binary signals, in defined time intervals (time slots) on said channel, each signal being associated with a specific time slot in each transmission period.

Said digital systems often require the presence of a processing unit which controls the terminals and the various units constituting said system on the basis of one or more application packages and which can dialog with said controlled units by means of a PCM bus comprising one or more PCM channels. Thus, in view of the different signal control characteristics of existing processing units and of the PCM channels, an appropriate interface is necessary in said systems for allowing the dialog between the central processing unit and the terminals or units controlled thereby.

SUMMARY OF THE INVENTION

The aim of the present invention is indeed to provide a digital interface device for PCM signals, in particular for telephone, data processing or image processing systems, allowing the bidirectional exchange of data between a processing unit and a PCM channel.

Within this aim, a particular object of the present invention is to provide an interface capable of reliably handling the exchange of said PCM data, allowing an exact connection of the groups of data arriving from the PCM line in successive time slots and then supplying them grouped to the processing unit, and furthermore allowing exact control of the transmission of the data, supplied grouped in records by the processing unit, by dividing them into groups of binary signals and sending them in preset time slots in successive time periods on the PCM channel.

Not least object of the present invention is to provide an interface which has high flexibility and adaptability for connection and inclusion in systems of different types, in particular which can be used with PCM channels with different frequencies, and has a simple structure and modest manufacturing costs.

This aim, the mentioned objects and others which will become apparent hereinafter are achieved by the interface device for PCM, in particular for digital telephone, data processing or image processing systems according to the invention, as defined in the accompanying claims.

BRIEF DESCRIPTION OF THE DRAWINGS

The characteristics and advantages of the invention will become apparent from the following description of a preferred but not exclusive embodiment, illustrated only by way of non-limitative example in the accompanying drawings, wherein:

FIG. 1 illustrates the structure of the signals transmitted on the PCM channel;

FIG. 2 is a general block diagram of the digital interface according to the invention.

DESCRIPTION OF THE PREFERRED EMBODIMENTS

Figure 3:
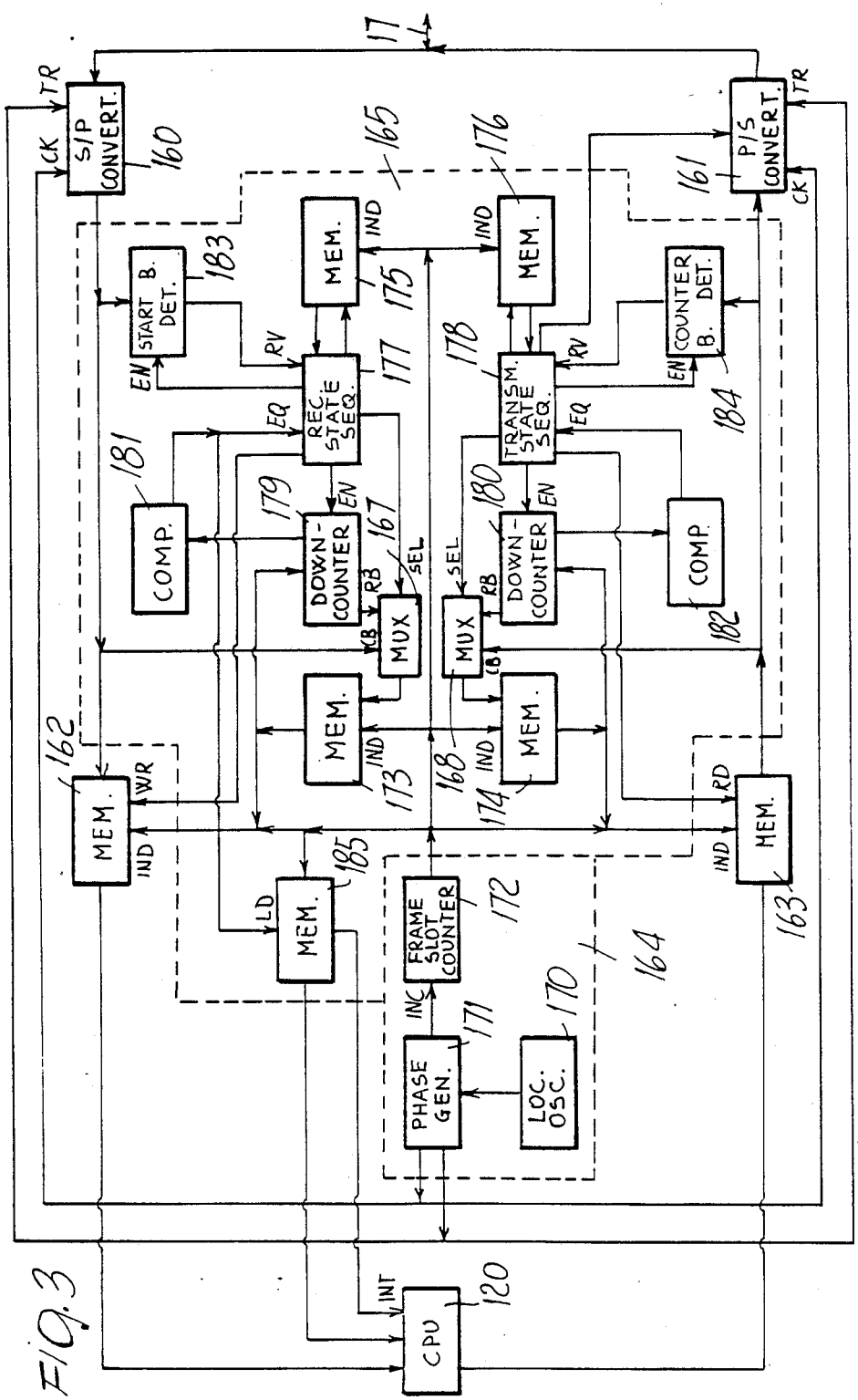
FIG. 3 is a detailed block diagram of the interface according to FIG. 2.

For the exemplification of the solution according to the invention, it is supposed that the PCM channel, on which the signals which are exchanged between the processing unit and the controlled terminals are transmitted, is constituted by a bidirectional two-wire line having a frequency of 2048 Kbit/sec, so that, in a frame period of the duration of 125 /usec, 32 time slots are transmitted, each containing 8 information bits related to an individual terminal. Furthermore, the frames of the PCM channel are organized in a periodic structure of eight frames termed "superframe" and illustrated in FIG. 1. Within a superframe, homologous time slots belonging to different frames are considered as separate entitles, identified hereinafter as frame slots and indicated in the figure at FS1, FS2, ... FS256. Therefore a superframe comprises 256 frame slots for each direction of transmission and the interface 132 can simultaneously setup 256 communications at a consequent rate of 8 Kbit/sec. Thus each communication between the terminals or units connected downstream of the PCM channel and the digital interface 132 for connection to a processing unit, not illustrated, occurs by dividing the data to be transmitted into various records, and the digital interface is capable of automatically handling their simultaneous reception and transmission in all the frame slots. Each record is constituted by a maximum total of 32 bytes, the first one whereof is a start byte, having for example all bits set to zero, the second is a counter byte, having a value comprised between 1 and 30 and representing the number of data bytes constituting the record, and the remaining ones are the data bytes, equal in number to the value of the counter byte.

Reference should now be made to FIG. 2, illustrating the more general block diagram of the digital interface according to the invention. As can be seen, the interface, generally indicated by the numeral 132, comprises a serial/parallel converter 160 connected at the input to the PCM line 17, a parallel/serial converter 161, connected at the output to the PCM line 17 or to a different PCM line, a reception memory 162, connected at the input to the converter 160, a transmission memory 163, connected at the output to the converter 161, a phase sequencer circuit 164 and a protocol controller 165, connected to one another, to the converters 160, 161 and to the memories 162, 163 to correctly process the data related to the frame slots, as well as a control processor 120.

In particular, the reception memory and the transmission memory are each divided into 256 buffers, each associated with a frame slot. At the beginning of a frame slot, the phase sequencer causes the byte present in the serial/parallel converter 160 (received in the preceding frame) to be sent to the reception memory 162 and to the protocol controller 165 and the byte present in the buffer of the transmission memory (to be transmitted in the justbegun frame slot) to be sent to the parallel/serial converter 161. During the frame slot, while the two converters respectively load and unload the bits associated with the current frame slot, the phase sequencer 164, taking into account the number of the frame slot being transmitted, addresses the reception memory 162 and the transmission memory 163 to allow the protocol controller to process the byte received in the preceding frame slot and the byte to be transmitted in the successive frame slot. Normally, when no significant transmission is associated with a frame slot, the byte received or transmitted by the digital interface is the idle byte, for example with all the bits set to 1.

In reception, starting from an idle condition, the protocol controller 165 checks the type of byte received. If it corresponds to the idle configuration, it ignores said byte, if instead it detects the configuration indicative of the start byte, it presets itself to allow reception of all the bytes of the homologous frame slots in the successive superframes for a number of superframes depending on the byte number contained in the record to be received, as specified in the successive counter byte. The protocol controller 165 furthermore causes storing of the received bytes in the buffer of the reception memory 162 associated with the frame slot being processed, as identified by the phase sequencer, while the location within the buffer is identified by said protocol controller. When the last byte of the record is received, and thus transmission ends, the protocol controller 165 informs the control processor 120 that a block of reception memory 162 has been filled with a record, so that the processor 120 can fetch it and process it.

In transmission, the startup of a communication on the frame slot is given by the control processor 120 which fills the buffer of the transmission memory 163 with the record to be transmitted and inserts the counter byte in first location. In the absence of communication an idle configuration will instead be present in the buffer. Thus, starting from an idle state, the protocol controller 165 checks the type of byte contained in the first location of the memory buffer associated with the frame slot being processed in that instant. If said byte corresponds to the idle configuration, the controller ignores it, if instead it recognizes the counter byte it sends the start byte, presetting itself for the transmission of the counter byte and of a number of data equal to the value of said counter byte in the homologous frame slots of the successive superframes. The protocol controller 165 thus extracts the bytes to be transmitted from the buffer of the transmission memory 163 associated with the frame slot being processed, as identified by the phase sequencer 164, while the location within the buffer is identified by said protocol controller 165. At the end of the transmission of the record, the protocol controller 165 restores the idle byte configuration in the first location of the buffer of the transmission memory 163 associated with the frame slot being processed at that instant.

FIG. 3 illustrates the detailed block diagram of the digital interface 132. As can be seen, the phase sequencer 164 comprises a local oscillator 170 at 8192 KHz driving a phase generator 171 connected on one side to the serial/parallel and parallel/serial converters 160, 161 and on the other side to a frame slot counter 172 which on its input INC receive the count pulses from said phase generator so that its output has a value corresponding to the frame slot being processed at that instant. The protocol controller 165 in turn comprises a plurality of memories, and precisely the reception current address memory 173, the transmission current address memory 174, the reception state memory 175 and the transmission state memory 176, each having 256 locations, each associated with a frame slot, correspondingly to the buffers of the reception and transmission memories 162 and 163; then the memories 173–176 are addressed at the respective inputs IND, for specifying which of the 256 locations contains the data related to the frame slot being processed at that instant. The current address memories 173, 174 store the number of data bytes of a record still to be received, which number also represents the address of the current location in the reception or transmission buffer, while the state memories 175, 176 feed the reception 178 and transmission 178 state sequencer circuits with configurations indicative of the state of the frame slot being processed (that is to say, if it is in idle state, awaiting a counter byte or in data reception or transmission state). The controller 165 furthermore comprises two down-counters 179 and 180, enabled on the input EN respectively by the sequencer 177 and by the sequencer 178 and connected, by means of multiplexers 167, 168, respectively to the reception current address memory 173 and to the transmission current address memory 174 so as to generate the addresses of the successive locations within the buffers of the memories 162 and 163, when so enabled by the sequencers 177 and 178. These addresses are then sent to the inputs CB of the multiplexers 167, 168, each having a second input RB connected respectively to the output of the serial/parallel converter 160 and to the output of the transmission memory 163, and a selection input SEL, connected to an output of the sequencer 177 or 178 to select which of the two inputs must be sent at the output towards the current address memory 173 and 174. The controller 165 also comprises two zero comparators 181 and 182, respectively for reception and transmission, for detecting the end of reception or of transmission of the record, as well as a start byte detector circuit 183 connected to the output of the converter 160, to identify the start of the reception and a counter byte detection circuit 184 connected to the transmission memory 163 to identify the start of the transmission of a record. A buffer memory 185 is furthermore provided in the controller 165 and is connected to the comparator 181 and to the processor 120 to store the number of the frame slot associated with the reception buffer containing an entire record and supply it to the processor 120.

The operation of the circuit of FIG. 3 is as follows. In reception, at the beginning of a frame slot, the phase generator 171 causes the serial/parallel converter 160 to transfer the byte received in the preceding frame slot from the shift register to the output register of the same converter 160. In this manner the shift register of the converter remains free for the reception of the bits associated with the current frame slot, bits which are sampled by means of a signal arriving from the phase generator on the input CK, while the protocol controller processes the byte received in the preceding frame slot. Assume the preceding frame slot, currently being processed, was in idle condition, with the reception state memory 175 storing, in the position associated with said frame slot, the idle configuration. In this condition the reception state sequencer 177 keeps the start byte detector 183 enabled, which thus continuously checks the received byte to detect the reception of the start byte, indicative of the beginning of a data transmission. The reception part thus keeps in this state until the detector 183 detects a start byte.

When the detector recognizes said start byte, indicating the beginning of the reception of a record, it notifies this event to the sequencer 177 on the RV input thereof which thus stores a configuration indicating the counter byte reception wait state in the reception state memory 175, at the location associated with the processed frame slot.

In the successive homologous frame slot, upon the reception of the counter byte, the reception state sequencer 177, fetching the current state from the reception state memory 175, disables the start byte detector 183 and enables the storage of the counter byte in the current address memory 173 (controlling the multiplexer 167 on the input SEL so that the same supplies to the memory 173 the datum present on its input CB) and in the memory 162 (acting on the input WR thereof) in the buffer indicated by the counter 172 and in the location of the buffer currently addressed by the current reception address memory 173, having zero value. Once the storage has occurred, said zero position will indeed contain the value of the counter byte, so that at the successive homologous frame slot the current address memory 173 addresses a new location within the buffer, equal in value to the counter byte and intended to accommodate the first received data byte. In the meantime the sequencer has loaded the reception state memory 175 with a configuration corresponding to the data byte reception wait state.

The successive bytes of the record are then stored consecutively in the reception buffer in locations having progressively decreasing values, while the configuration stored in the reception state memory 175 remains unchanged. In the meantime, the down-counter always updates the buffer location addressed by the current address memory 173 and stores it again therein through the multiplexer 167, now controlled by the state sequencer 177 so as to output the datum present on its input RB. Every time the down-counter furthermore sends the value corresponding to said updated location also to the comparator 181, which thus compares said value with zero. When thus the comparator detects that the value supplied by the down-counter 179 has become equal to zero, that is to say when the last byte of the record is received, it informs the phase sequencer 177, on its input EQ. that the reception phase is to be ended. Accordingly the sequencer stores in the memory 175 the configuration corresponding to the idle state. Simultaneously the comparator informs the buffer memory 185, on its input LD, that the frame slot addressed by the frame slot counter 172 is associated with a reception buffer containing a complete received record, thus enabling the storage, in said buffer memory, of said frame slot number so that then the control processor 120, informed by the buffer memory on the input INT, can fetch it and process it.

In transmission, at the beginning of a frame slot, the phase generator 171 instructs the parallel/serial converter 161, on the input TR, to transfer the byte processed in the preceding frame slot from the input register to the shift register of said converter. In this manner the shift register can transmit on line 17 the bits corresponding to the previous frame slot, being synchronized by a signal arriving from the phase generator 171 and supplied on the input CK.

Assume one is in the idle state. In these conditions the transmission state memory 176 stores the corresponding configuration and the transmission state sequencer 178 keeps the counter byte detector 184 enabled to check the byte present in the first location (identified as location "zero") of the transmission buffer associated with the frame slot being processed. Until the buffer stores the idle configuration, the state of the network remains unchanged.

When the byte in the first location of the buffer assumes a value different from the idle one, that is to say it represents the counter byte of the record to be transmitted, the counter byte detector notifies the event to the state sequencer 178, on the input RV of the latter, which thus sends the start byte towards the converter 161 and stores a configuration corresponding to the counter byte transmission state in the transmission state memory 176.

In the successive homologous frame slot, the transmission memory 163, addressed by the current address memory 174 (in turn storing the address supplied by the multiplexer 168 and corresponding to location zero), sends the first stored byte, coinciding with the counter byte, towards the converter 161, while the transmission state sequencer 178 reads the state of the memory 176, disables the counter byte detector 184 and, by means of the selection input SEL of the multiplexer 168, enables the latter to send at the output the datum present on its input CB, thus causing the storage of the counter byte in the current address memory 174 at the location associated with the frame slot being processed at that instant. In this manner, at the subsequent transmission, the current address memory 174 determines the location within the buffer in which the first byte to be transmitted is stored, said location having an address equal to the length of the complete record to be transmitted. Simultaneously the sequencer feeds the transmission state memory 176 with the configuration corresponding to the data byte transmission status.

Subsequently, at the successive homologous frame slot, the first data byte of the record to be transmitted is taken, within the buffer associated with that frame slot, from the location addressed by the current address memory 174 and is sent to the converter 161, while the configuration of the successive state remains unchanged. As for the reception section, the address stored by the current address memory 174 is simultaneously sent to the downcounter 180 which updates it and again supplies it, through the multiplexer 168 (now controlled by the signal supplied by the sequencer 178 on the input SEL so as to send the signal present on the input CB towards the output) to the current address memory 174 which thus addresses, inside the buffer, the address location equal to the counter byte decremented by one and storing the second data byte. The output of the down-counter is simultaneously supplied also to the comparator 182 which thus compares the down-counter output (therefore corresponding to the successive address) with the zero value to identify transmission end.

The various data bytes constituting the record are similarly transmitted one after the other.

When the last data byte is transmitted, the comparator 182 detects that the value of the output of the downcounter 180 has become equal to zero and therefore causes the transmission state sequencer 178 to terminate the transmission phase, storing the configuration corresponding to the idle state in the transmission state memory 176. Then the system sets in further transmission waiting state, returning to the beginning of the cycle.

Naturally the cycle described occurs in an exactly equal manner for all the frame slots of the transmission period, even if the different frame slots are handled independently from one another.

The invention thus conceived is susceptible to numerous modifications and variations, all of which are within the scope of the inventive concept.

Furthermore, all the details may be replaced with other technically equivalent ones.

We claim:

1. A digital interface device for PCM data for exchanging simultaneously a plurality of PCM data records between a central processing unit and a PCM channel, said PCM channel being divided into successive groups of time intervals and each said PCM data record including a plurality of data groups, each said data record being sent on said PCM channel at successive groups of time intervals with each data group being associated to preset time intervals in each said group of time intervals, the interface device comprising:
means for simultaneously receiving a plurality of data records received from said PCM channel, said simultaneous receiving means including:
a plurality of reception buffers, each said reception buffer being associated with preset time intervals in each of said group of time intervals for storing the data record received in the associated time intervals, and means for selectively enabling said reception buffers at the associated time intervals for storing successive data groups received at successive time intervals in different reception buffers, and for storing in a same reception buffer the plurality of data groups belonging to a data record and received, spaced apart from each other, at successive groups of time intervals and
means for simultaneously transmitting a plurality of data records to be sent on said PCM channel, said simultaneous transmitting means including:
a plurality of transmission buffers, each said transmission buffer being associated with preset time intervals in each of said groups of time intervals and storing the data groups of a data record to be sent on said PCM channel at the associated time intervals, and means for selectively enabling said transmission buffers at the associated time intervals for sending data groups belonging to different data records at successive time intervals and for sending the data groups of a data record stored in each transmission buffer at successive groups of time intervals.

2. An interface device according to claim 1, wherein each said data record comprises a record start data group and record length data group and wherein said means for selectively enabling said reception buffers includes means for detecting said record start data group and for enabling the reception buffer at the associated time intervals upon detection of said record start data group and said means for selectively enabling said transmission buffers includes means for detecting said record length data group and for enabling the transmission buffer at the associated time intervals upon detection of said record length data group.

3. An interface device according to claim 1, wherein said reception buffers define a reception memory and said transmission buffers define a transmission memory, and wherein said means for selectively enabling said reception buffers and said transmission buffers comprise a control processor connected to said reception and transmission memories, a timing phase sequencer connected to said reception and transmission memories for associating said reception and transmission memories to said time intervals and a protocol controller connected to said reception and transmission memories, to said control processor and to said timing phase sequencer for detecting beginning of reception of a data record, for controlling correct storage of the data groups of a data record in a same buffer of said reception memory, for sending received data record signalings towards said control processor and for controlling correct transmission of data records from said transmission memory in said data groups onto said PCM channel at preset time intervals.

4. An interface device according to claim 3, further comprising a serial/parallel converter having an input connected to said PCM channel and an output connected to said reception memory and said protocol controller, and a parallel/serial converter having a first data input connected to said transmission memory, a second control input connected to said protocol controller and an output connected to said PCM channel.

5. An interface device according to claim 1, wherein each said data record comprises a first data group having a preset configuration indicative of record start, a second data group indicative of the length of said record and at least one further data group, said data groups being received at different time intervals, spaced apart from each other by a preset time, said protocol controller comprises a reception stage including a record start detector, connected to said PCM channel for detecting said first data group and generating a record start signal, a reception state sequencer, connected to said record start detector for enabling said record start detector at the end of a data record reception, a reception current address memory, connected to said PCM channel and addressing said reception memory for grouping the data groups of a same record received at said different time intervals, a down-counter enabled by said reception state sequencer and connected to said reception current address memory for receiving memory addresses and generating updated memory addresses for storage of successive data groups, a comparator, connected to said state sequencer for comparing the updated memory addresses generated by said down-counter to a zero value and generating a reception end signal, as well as a buffer memory, connected to said comparator for storing the address of a memory location of said reception memory storing an entire record and for sending a complete record signal to said control processor.

6. An interface device according to claim 5, wherein said reception stage of said protocol controller comprises a multiplexer having a first input connected to said PCM channel, a second input connected to said down-counter, a selection input, connected to said reception state sequencer and an output connected to said reception current address memory.

7. An interface device according to claim 5, wherein said reception stage of said protocol controller further comprises a reception state memory connected to and controlled by said reception state sequencer for storing a state configuration selectively corresponding to a record start waiting state, a second data group waiting state and a data reception state.

8. An interface device according to claim 1, wherein each said data record comprises a first data group having a preset configuration indicative of record start, a second data group indicative of the length of said record, and at least one further data group, said data groups being transmitted at different time intervals, spaced apart from each other by a preset time, wherein said protocol controller comprises a transmission stage including a transmission state sequencer, a transmission start detector, connected to said transmission memory for detecting said first data group and generating a record start signal sent to said transmission state sequencer, a transmission current address memory, addressing said transmission memory for allowing transmission in sequence of said data records at said different time intervals, a down-counter, enabled by said transmission state sequencer and connected to said transmission current address memory for receiving memory addresses and generating updated memory addresses fed to said transmission current address memory, a comparator, enabled by said transmission state sequencer and connected to said down-counter for comparing with zero said updated memory addresses and generating a transmission end signal when said updated memory addresses are equal to zero.

9. An interface device according to claim 8, wherein said transmission stage furthermore comprises a multiplexer having a first input connected to the output of said transmission memory, a second input connected to said transmission down-counter, a selection input connected to said transmission state sequencer and an output connected to said transmission current address memory.

10. An interface device according to claim 8, wherein said transmission stage of said protocol controller further comprises a transmission state memory connected to and controlled by said transmission state sequencer for storing a state configuration selectively corresponding to a record start waiting state, a second data group transmission state and a data transmission state.

* * * * *